United States Patent
Salameh et al.

(10) Patent No.: US 6,405,453 B1
(45) Date of Patent: Jun. 18, 2002

(54) MATERIAL DRYING ARRANGEMENT

(75) Inventors: Naom Salameh; Stanley T. Wheeler, both of Jefferson County, KY (US)

(73) Assignee: Cissell Manufacturing, Inc., Louisville, KY (US)

( * ) Notice: Subject to any disclaimer, the term of this patent is extended or adjusted under 35 U.S.C. 154(b) by 0 days.

(21) Appl. No.: 09/871,757

(22) Filed: Jun. 1, 2001

(51) Int. Cl.[7] .............................. F26B 3/00; F26B 21/06
(52) U.S. Cl. ............................ 34/491; 34/260; 34/318; 34/495; 34/543; 34/549; 34/565
(58) Field of Search ...................... 34/260, 261, 318, 34/327, 499, 524, 528, 543, 537, 495, 491, 549, 565

(56) References Cited

U.S. PATENT DOCUMENTS

| | | | | |
|---|---|---|---|---|
| 4,795,871 A | * | 1/1989 | Strattan et al. | 219/10.55 |
| 4,916,291 A | * | 4/1990 | Jan | 219/492 |
| 5,347,727 A | * | 9/1994 | Kim | 34/491 |
| 5,444,924 A | * | 8/1995 | Joslin et al. | 34/486 |
| 5,661,227 A | * | 8/1997 | Smith et al. | 73/29.01 |
| 5,906,794 A | * | 5/1999 | Childers | 422/28 |
| 6,122,840 A | * | 9/2000 | Chbat et al. | 34/496 |

* cited by examiner

*Primary Examiner*—Ira S. Lazarus
*Assistant Examiner*—K. B. Rinehart
(74) *Attorney, Agent, or Firm*—Polster, Lieder, Woodruff & Lucchesi

(57) ABSTRACT

An arrangement for drying material in a selected drying location by a heated and flowing drying stream wherein the temperature and relative humidity levels of the drying stream are sensed upstream and downstream of such selected drying location and are relatively and comparatively controlled to arrive at a selected treated material moisture with comparatively minimal energy input.

15 Claims, 4 Drawing Sheets

MATERIAL DRYING ARRANGEMENT

BACKGROUND OF THE INVENTION

The present invention relates to a material drying arrangement and more particularly to a unified apparatus and method for drying materials such as fabric in a selected location with a drying stream modulated in flow and temperature by a blower and heating member, respectively, which are controlled in accordance with coordinated sensed upstream and downstream temperatures and relative humidity.

It is known in the prior art to utilize dryer apparatus responsive to either or both sensed temperatures and relative humidities. In this regard, attention is directed to U.S. Pat. No. 4,086,707, issued to S. Bochan on May 2, 1978, U.S. Pat. No. 4,231,166, issued to S. L. McMillan on Nov. 4, 1980; U.S. Pat. No. 4,267,643, issued to J. C. Hariedon on May 19, 1981 and U.S. Pat. No. 4,891,893, issued to R. K. Narang on Jan. 9, 1990. These four patents teach various arrangements for clothes dryers responsive to sensed temperatures in heated drying air. Attention is further direct to U.S. Pat. No. 6,079,121, issued to P. S. Khadkikar, et al, on Jun. 27, 2000 and U.S. Pat. No. 6,122,840, issued to N. W. Chbat et al on Sep. 26, 2000, both of which teach arrangements wherein clothes dryers are responsive to humidity changes. In addition, attention is directed to the three U.S. Pat. No. 5,315,765, issued to M. Holst et al on May 31, 1994, U.S. Pat. No. 6,098,310, issued to Y-T Chen et al on Aug. 8, 2000 and to U.S. Pat. No. 6,141,887 issued to Y-T Chen et al on Nov. 7, 2000, all three of which patents teach clothes dryer arrangement wherein clothes dryers are responsive to both sensed temperatures and humidities—it being noted that U.S. Pat. No. 5,315,765, senses temperature and humidity at both clothes dryer intake and exhaust. Finally, attention is directed—as of general interest—to the clothes dryer arrangements of U.S. Pat. No. 4,546,554, issued to N. J. Bullock et al on Oct. 15, 1985 and U.S. Pat. No. 6,115,680, issued to W. D. Barritt on Sep. 19, 2000, it being noted that the majority of the above referenced patents are directed to clothes dryer structure adapted in residential usage wherein clothes drying loads are substantially less than the larger loads familiar in commercial drying situations.

The present invention provides a unique material drying arrangement which can be utilized for both commercial and residential drying, which provides a novel healing and ventilating arrangement requiring a minimum of novel parts to construct and maintain and which provides a minimum of novel steps to operate. The present invention further provides for comparatively more efficient, economical, and straight forward operational control with a comparatively larger energy savings, efficiently utilizing less energy with the efficient consumption of lower amounts of gas and electrical energy.

It is to be understood that various other features of the present invention will become obvious to one skilled in the art upon reading the disclosure set forth herein.

BRIEF SUMMARY OF THE INVENTION

More particularly the present invention provides a unique and novel material dryer apparatus including a housing with a drying basket disposed therein and having a drying stream heater and blower associated therewith, a control arrangement for the dryer apparatus comprising: temperature sensing means disposed to sense the drying stream temperatures entering upstream and exiting downstream the drying means; relative humidity sensing means disposed to sense the drying stream relative humidity entering upstream and existing downstream the drying basket; and control means connected to the temperature sensing means and the relative humidity sensing mean, the control means being connected to the heater and the blower to cooperatively and intermittently modulate drying heat input and drying stream volume delivery in the heater and the blower with respect to each other and in accordance with sensed temperatures and relative humidity levels entering upstream and exiting downstream the said dryer basket.

Further, the present invention provides a unique and novel method of drying material to a selected moisture level comprising: introducing the material in a drying zone; measuring the temperature and relative humidity of a material drying stream passing through the drying zone along both at the upstream inlet and downstream outlet of the drying zone; and cooperatively and intermittently controlling the heating and flow of the drying stream passed through the drying zone with respect to measured upstream and downstream temperature and relative humidity whereby material removed from said drying zone has a select moisture level for further treatment with selected drying of the material being accomplished at an optimal energy level.

It is to be understood that one or more changes can be made by one skilled in the art in one or more of the several parts of the apparatus disclosed herein and in one or more of the several steps of the method disclosed herein without departing from the scope or spirit of the present invention. Further, it is to be understood the unique and novel unified apparatus and method as disclosed is not to be considered as limited to fabric treatment such as clothing or garments but can be utilized in other heating and ventilating environments where temperature and relative humidity control are involved. Moreover, although the unified arrangement herein disclosed has significant energy saving capabilities in commercial environments it would also have such similar capabilities in residential environments.

BRIEF DESCRIPTION OF THE DRAWINGS

Referring to the drawings which disclose a schematic arrangement of one embodiment of the present invention.

DETAILED DESCRIPTION OF THE INVENTION

Figure 1:
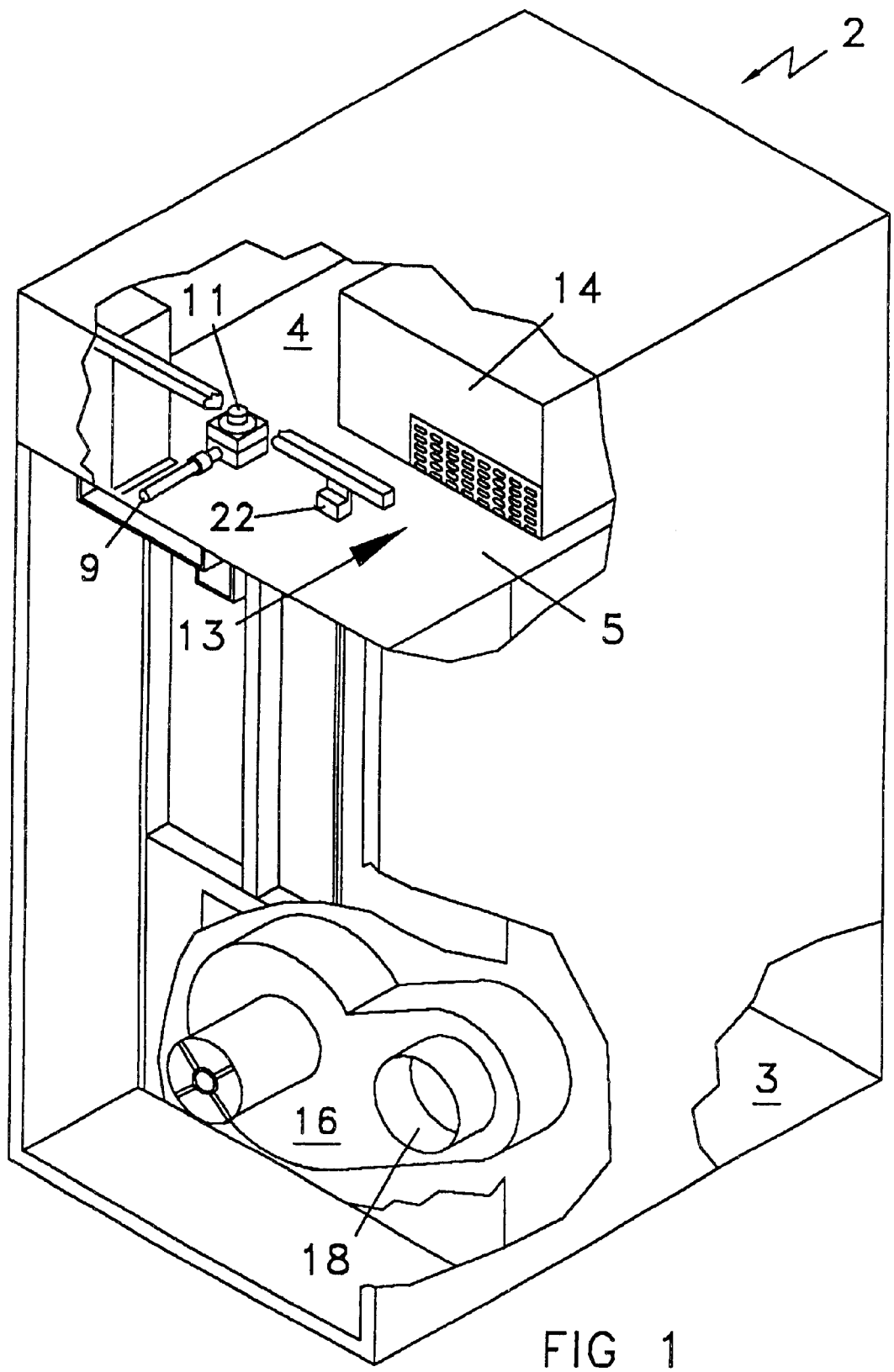
FIG. 1 is an isometric, broken away partial view of a portion of the novel drying apparatus of the present invention, disclosing portions of the front, rear and one side of the novel drying apparatus.

Referring to the unique and novel commercial dryer arrangement as disclosed in the broken away, isometric view of FIG. 1, a rectangularly shaped dryer housing 2, which can be formed from any one of several strong, substantially rigid materials, such as a suitably coated sheet metal, can be seen.

Figure 2:
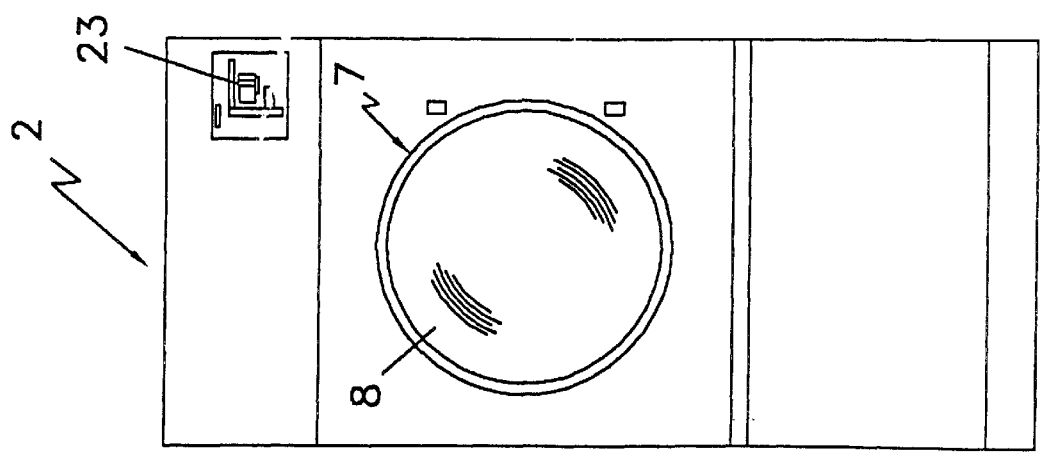
FIG. 2 is a front end vertical view of the novel drying apparatus of FIG. 1.

Housing 2 serves to define a large drying chamber 3 and an upper chamber 4 partitioned by horizontal partition 5. As can be seen in the broken away schematic view of FIG. 5, drying chamber 3 serves to include a motor driven, reciprocating rotatable perforated drying basket 6 which holds and rotates the materials to be heat dried. The materials to be heat dried are passed to dryer basket 6 through the hinged door 7 at the front end of housing 2, the door 7 being provided with a transparent glass or plastic material viewing sealed porthole 8 (FIG. 2).

Figure 5:
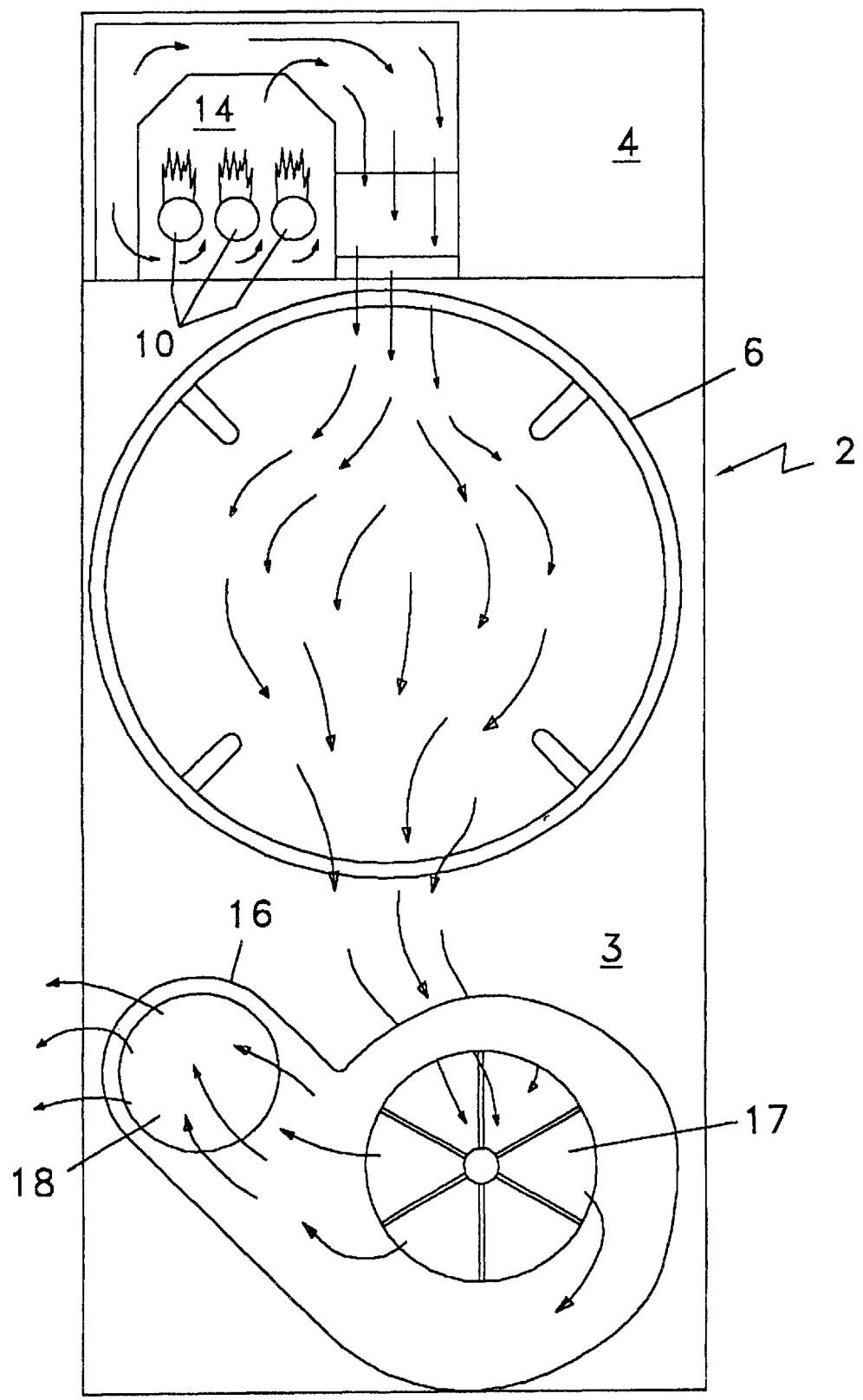
FIG. 5 is a schematic, broken away, vertical front sectional view of the line of stream drying flow view of the novel drying apparatus of FIGS. 1–4.

Again, referring to FIG. 1 of the drawings, the partitioned, upper chamber 4, incorporates a gas feed pipe 9 feeding burners 10 (FIG. 5). Pipe 9 is connected to a suitable external gas supply source (not shown). Gas feed pipe 9 incorporates a gas valve 11, which is controlled in an intermittent manner described hereinafter through a humidity and temperature control sensor 21 and 22 and which also is disposed in chambers 3 and 4. Chamber 4 is provided with a rear chamber inlet 13 (FIG. 1) through which a suitable drying fluid to be heated, such as ambient air, can be introduced into chamber 4. Chamber 4 includes a secondary chamber 14, which serves as a heating unit with ambient air passing from chamber 4 into secondary unit 14 (FIG. 5). It is to be understood that fabric material can be inserted through hinged door 7 with porthole 8 (FIG. 3) into the motor driven, perforated, rotatable drying basket 6 (FIG. 5).

Disposed in the lower portion of chamber 3, defined by housing 2 is a rotatable motor driven centrifugal blower 16 (FIGS. 1, 3, 4 and 5) which serves to draw a heated drying stream from gas heating drying chamber 14 into chamber 3 through motor driven rotatable perforated drying basket 6 over the fabric materials inserted into the drying basket 6 and ultimately through the blower inlet 17 of blower 16 (FIG. 5) and through exhaust outlet 18, in housing 2 (FIGS. 1 and 5) the exhaust outlet of fan or blower 16 being connected thereto.

Figure 4:
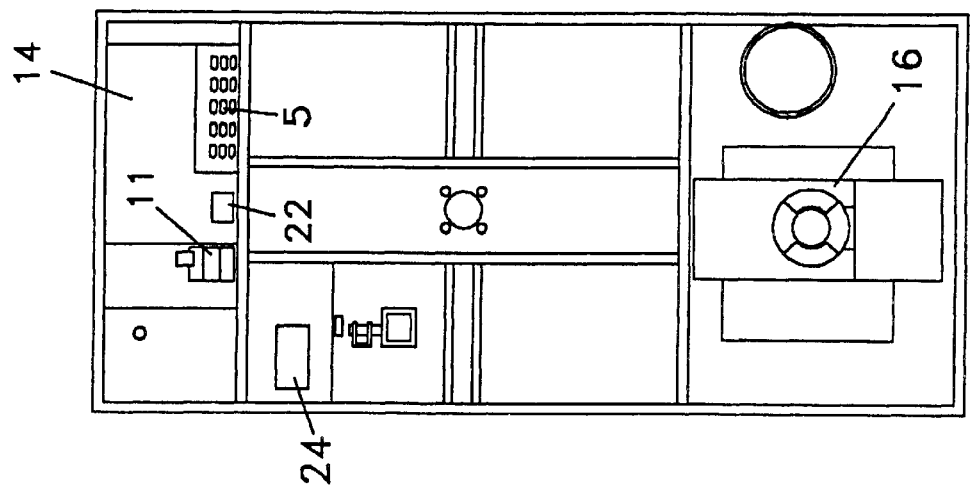
FIG. 4 is a rear end vertical view of the novel drying apparatus of FIG. 1.
Figure 3:
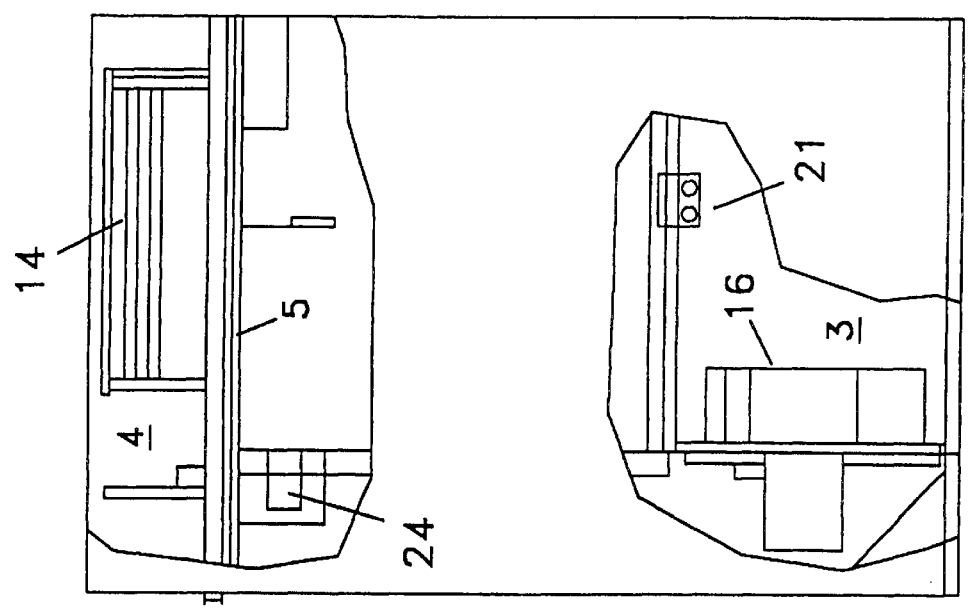
FIG. 3 is a schematic broken away vertical side view of the novel drying apparatus of FIG. 1.
Figure 6:
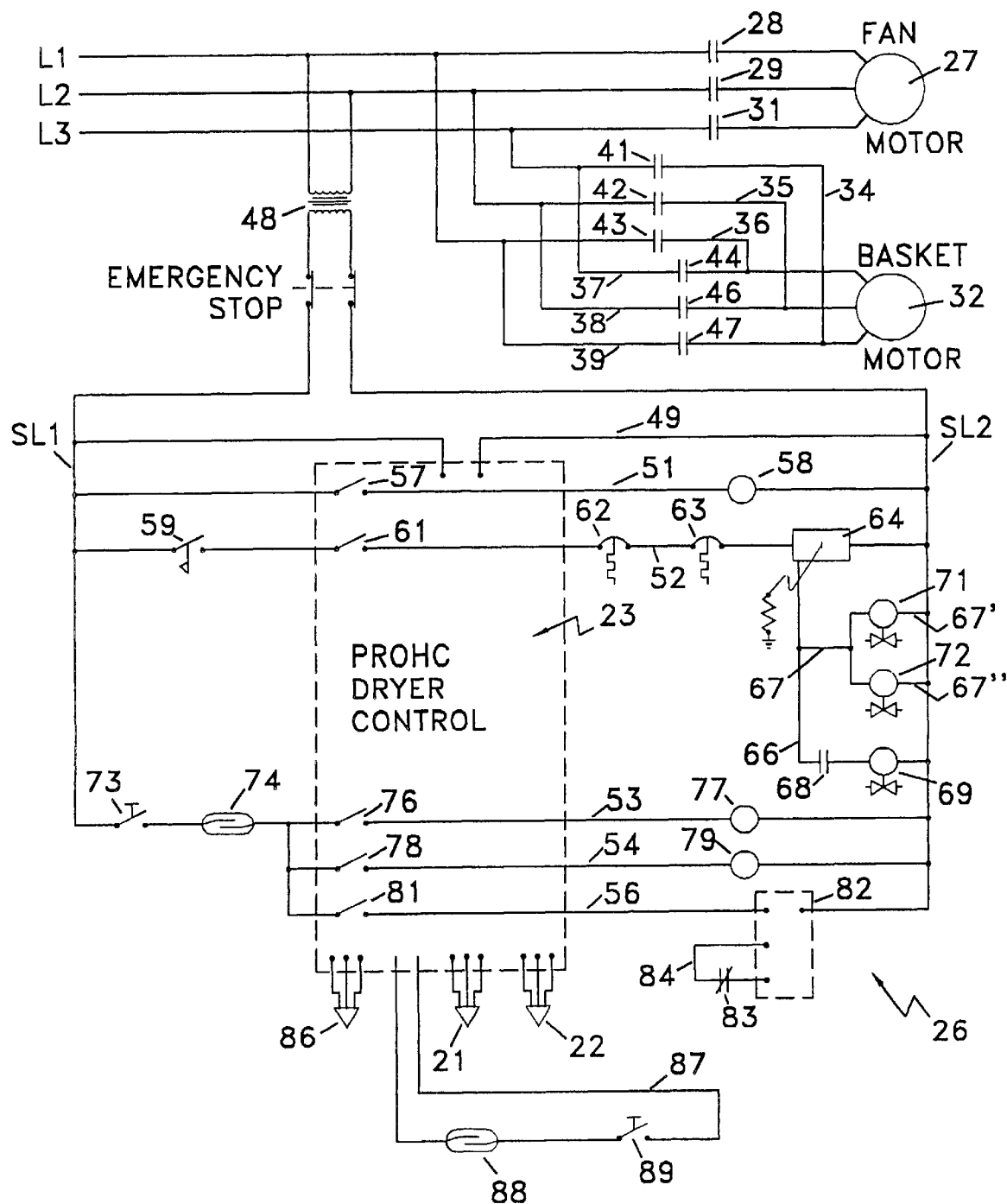
FIG. 6 is a schematic, electrical circuit for the novel drying apparatus of FIGS. 1–5.

As can be seen in FIGS. 3 and 4 of the drawings, a temperature and humidity sensor 21 is provided in the lower drying chamber 3, serving to sense the exhaust temperatures and relative humidity in compatible intermittent cooperation with temperature and humidity sensor 22 in upper chamber 4 above partition 5, all in accordance with the present invention and the inventive circuitry described hereinafter. In this regard, it is to be noted that a suitable programmable humidity and temperature circuitry controller 23 is mounted on the upper front face of housing 2 (FIG. 2) and that a reversing motor inverter 24 (FIG. 3) is suitably mounted below partition 5 in the upper rear of housing or cabinet 2 (FIGS. 3 and 4), these two units 23 and 24 being an important part of the inventive circuitry 26 of FIG. 6 as described hereinafter.

In accordance with the present invention, it is to be noted that the blower motor speed for blower 16 can operate in the low frequency range of approximately thirty (30) Hertz (Hz) to a high frequency range of approximately sixty Hertz. The heater can operate in such embodiment in the high heating range of approximately one hundred eighty thousand (180,000) British Thermal Units (BTU) to the Low heating range of approximately seventy-eight-thousand (78,000) British Thermal Units (BTU). In this regard, it is to be further noted that control 23 can be provided with multiple relative humidity settings and temperature control settings which can range up to ten (10) relative humidity settings and for temperature settings in the Fahrenheit range of approximately thirty two (32) to one hundred ninety seven (197) degrees Fahrenheit (F°). It is to be understood that the High and Low intermittent frequency ranges and BTU ranges can be varied by one skilled in the art according with material and dryer demands.

Referring to the inventive circuitry 26 of the present invention, a three (3) phase (PH) line L1, L2, L3 is disclosed capable of carrying two hundred (200) to six hundred (600) volts (v) is disclosed for use with commercial dryers. It is to be understood that the present inventive circuitry could be employed with lower voltage single or three-phase circuitry delivery. Lines L1, L2, L3 can be seen as directly connected to fan or blower motor 27 for the centrifugal fan or blower 16 through normally open variable speed drive contacts 28, 29, and 31 respectively.

Also, connected across lines L1, L2 and L3 is the basket motor 32 for rotation of the above-mentioned drying basket 6. As can be seen, basket motor 32 is connected in parallel to fan motor 27 and to the three-phase lines L1, L2 and L3, through line set 34, 35 and 36 and line set 37, 38 and 39 respectively, with suitable sets of normally open forward drive contacts 41, 42 and 43 and normally open reverse contacts 44, 46, and 47 being employed in the two sets of line set 34, 35 and 36 and line set 44, 46 and 47, respectively.

Connected across lines L1, L2 of the three phase line L1, L2 and L3 through a twenty four (24) volt (v) step-down transformer 48 are step down lines SL1 and SL2. Four lines, 49, 51, 52 and 53 extend between SL1 and SL2 and two additional lines 54 and 56 extend between line 53 and SL2. Connected in line 49 is the above-discussed controller 23 (PROHC). As above noted, this controller 23, which is fastened to the front face of housing 2 (FIG. 2) serves to modulate the heat and blower 16 through temperature and humidity sensor 21, located in chamber 3 of housing 2 and the temperature and humidity sensor 22, located in upper chamber 4 of housing 2. Extending along line 51 between lines SL1 and SL2 and within control 23 is a cycle switch 57. Line 51 further includes an energy smart relay 58 positioned in line 51 outside dryer control 23. Line 52 extending between lines SL1 and SL2 includes an air switch 59, outside control 23, a heat switch 61 within control 23, and again outside control 23 but in line 52 are basket and bonnet thermostats 62 and 63 respectively. The basket thermostat can be appropriately positioned in chamber 3 of housing 2 proximate drying basket 6 and the bonnet thermostat can be appropriately positioned in chamber 4 of housing 2 above partition 5. Also positioned in line 52 outside control 53 is a direct spark igniter 64. Connected to igniter 64 is a line 66, the opposite end of which line 66 is connected to line SL2. A further line 67 extends between line 66 and line SL2. Line 66 include an energy smart relay contact 68 and High BTU gas valve 69. Line 67 includes parallel lines 67' and 67" connecting in parallel with Low BTU main gas valve 71 and a redundant gas valve 72.

Positioned in line 53 extending between lines SL1 and SL2 outside dryer control 23 is a lint door switch 73 and a door reed switch 74. A switch 76 within dryer control 23 serves, when closed, to energize in line 53 forward contactor 77. In lines 54 extending between line 53 and line SL2, a switch 78, also within dryer control 23, serves, when closed, to energize reverse contactor 79 in line 54—both contactors 77 and 79 being outside dryer control 23. In line 56 which also extends between line 53 and line SL2, a fan or blower switch 81 for blower 16 is included in control 23 and outside control 23 in line 56 is a variable speed drive or frequency controller 82. This variable speed drive 82 or frequency controller includes line 84 having an energy smart relay contact 83 connected in line 84 calling for High blower speed.

Finally, connected in the lower portion of dryer control 23 is a rotation sensor 86, a line 87 including a door reed switch 88 and a lint door switch 89. Dryer control 23 also includes humidity and temperature sensors 21 and 22.

From the description of this electrical control circuit 26, it can be seen that the inventive dryer arrangement is capable of a unique control wherein the heat and the blower 16 are efficiently controlled through cooperative intermittent modulation of sensed inlet temperatures and relative humidities which are modulated intermittently with sensed outlet temperatures and relative humidities—all in an efficient, straight forward manner with a minimum of parts and a minimum of operating steps and with a minimum of energy usage and cost.

In a typical operation of the inventive arrangement, the temperature and humidity sensors 21 and 22 located in chambers 3 and 4 respectively communicate the measurements of a dryer control 23 which averages these measurements to obtain an operative relative humidity and temperature. The controller 23 is provided with a select number of relative humidity settings—approximately ten (10)—and a definite number of settings for temperatures—between thirty-two (32) to one hundred ninety seven (197) degrees Fahrenheit (F°). At a preset relative humidity (switch point) controller 23 will switch a contact connected to variable speed drive 82, which is connected to fan motor 27, allowing the fan motor 27 to run on preset levels of frequency ranging from sixty (60) down to thirty (30) Hertz (Hz). At the same time, contacts also switch a two-stage High-Low gas valve arrangement in lines 66 and 67—thus resulting in an approximately twenty (20) percent (%) gas usage savings. With the relative humidity switch point set at a High level, the inventive dryer starts with a High BTU input and a Low cubic feet per minute blower 16 input. When the sensors read a preset average relative humidity, controller 23 switches the two-stage High-Low gas valve arrangement so as to obtain a Low Heat input and switches the frequency drive controller to obtain a High cubic feet per minute (cfm) flow.

The invention claimed is:

1. In a material dryer apparatus including a housing with a drying basket disposed therein and having a drying stream heater and blower associated therewith, a control arrangement for said dryer apparatus comprising: temperature sensing means disposed to sense the drying stream temperatures entering upstream and exiting downstream said drying means; relative humidity sensing means disposed to sense the drying stream relative humidity entering upstream and existing downstream said drying basket; and control means connected to said temperature sensing means and said relative humidity sensing mean, said control means being connected to said heater and said blower to cooperatively and intermittently modulate drying heat input and drying stream volume delivery in said heater and said blower with respect to each other and in accordance with sensed temperatures and relative humidity levels entering upstream and exiting downstream said dryer basket.

2. The material dryer apparatus of claim 1, wherein said control means can be programmed to alternatively set the change points for said heater and said blower.

3. The material dryer apparatus of claim 1, wherein said control means can be programmed to terminate a drying cycle.

4. The material dryer apparatus of claim 3, wherein said control means has selective multiple relative humidity settings for such programming.

5. The material dryer apparatus of claim 4, wherein there are advantageously ten (10) relative humidity settings in said control means for selective programming.

6. The material dryer apparatus of claim 1, wherein said downstream relative humidity can be selectively controlled to maintain a selected moisture level of material passed through said material dryer for further selected treatment thereof.

7. The material dryer apparatus of claim 1, wherein said temperature and relative humidity sensing means serves to control the heat input to said heater from a High to Low B.T.U. level.

8. The material dryer apparatus of claim 1, wherein said temperature and relative humidity sensing means serves to control the energy input to said blower from Low cubic feet flow per minute (cfm) to High cubic feet flow per minute (cfm).

9. The material dryer apparatus of claim 1, wherein said control means includes a fan frequency controller and which control means intermittently modulates heat input to said heater from a High to Low BTU level and compatibly, intermittently modulates energy input to said blower from Low cubic feet flow per minute (cfm) to High cubic feet flow per minute (cfm) to energy usage.

10. The material dryer apparatus of claim 1, wherein said blower motor speed operates in the Low speed frequency range of approximately thirty (30) Hertz (Hz) to the High speed frequency range of approximately sixty (60) Hertz (Hz).

11. The material dryer apparatus of claim 1, wherein said heater operates in the High heating range of approximately one hundred eighty thousand (180,000) British Thermal Units (BTU) to the Low heating range of approximately seventy eight thousand (78,000) British Thermal Units (BTU).

12. In a material dryer apparatus including a housing with a drying basket disposed therein and having a heater and blower associated therewith, a control arrangement for said dryer apparatus comprising: pairs of temperature sensing means and relative humidity sensing means disposed to sense the upstream air temperatures and relative humidities entering said housing and exiting said housing downstream said drying basket; and control means connected to said pairs or temperature sensing means and relative humidity sensing means, said control means being connected to said heater and blower to comparatively and intermittently modulate upstream and downstream temperatures and relative humidity levels in the High to Low heating ranges of approximately one hundred eighty thousand (180,000) British Thermal Units (BTU) to seventy eight thousand (78,000) British Thermal Units (BTU) and Low blower speed of approximately thirty (30) Hertz (Hz) to a High blower speed of approximately sixty (60) Hertz (Hz) so as to intermittently modulate the combination of heat and blower flow with respect to each other in an energy saving modulation in accordance with ambient conditions and dryer load, said control means including a series of programmable setting ranges for both temperature and relative humidity and a frequency controller to modulate said blower and a two-stage High and Low gas valve to modulate said heater each with respect to the other.

13. A method of drying material to a selected moisture level comprising: introducing said material in a drying zone; measuring the temperature and relative humidity of a material drying stream passing through said drying zone both at the upstream inlet and downstream outlet of said drying zone; and, comparatively and intermittently controlling the heat and flow of said drying stream passed through said drying zone with respect to measured upstream and downstream temperatures and relative humidities whereby material removed from said drying zone has a select moisture level for further treatment with selected drying of said material being accomplished at an optimal energy level.

14. The method of drying material of claim 13, wherein said heat and flow of said drying stream is intermittently and comparatively modulated in heat input from selected High to Low level and said flow is intermittently and comparatively modulated from Low to High level.

15. The method of drying material of claim 14, wherein said heat input is modulated in the High range of approximately one hundred eighty thousand (180,000) to the Low range of seventy eight thousand (78,000) British Thermal Units (BTU) and said flow level volume is comparatively modulated in the Low range of approximately thirty (30) Hertz (Hz) to the High range of approximately sixty (60) Hertz (Hz).

* * * * *